Jan. 24, 1967  J. R. CASSANO ETAL  3,300,206
ELECTRICALLY ENERGIZED CLUTCH FOR SHEET FEED CONTROL MECHANISM
Filed Dec. 31, 1964  7 Sheets-Sheet 1

INVENTORS.
JAMES R. CASSANO
LYMAN H. TURNER

ATTORNEYS

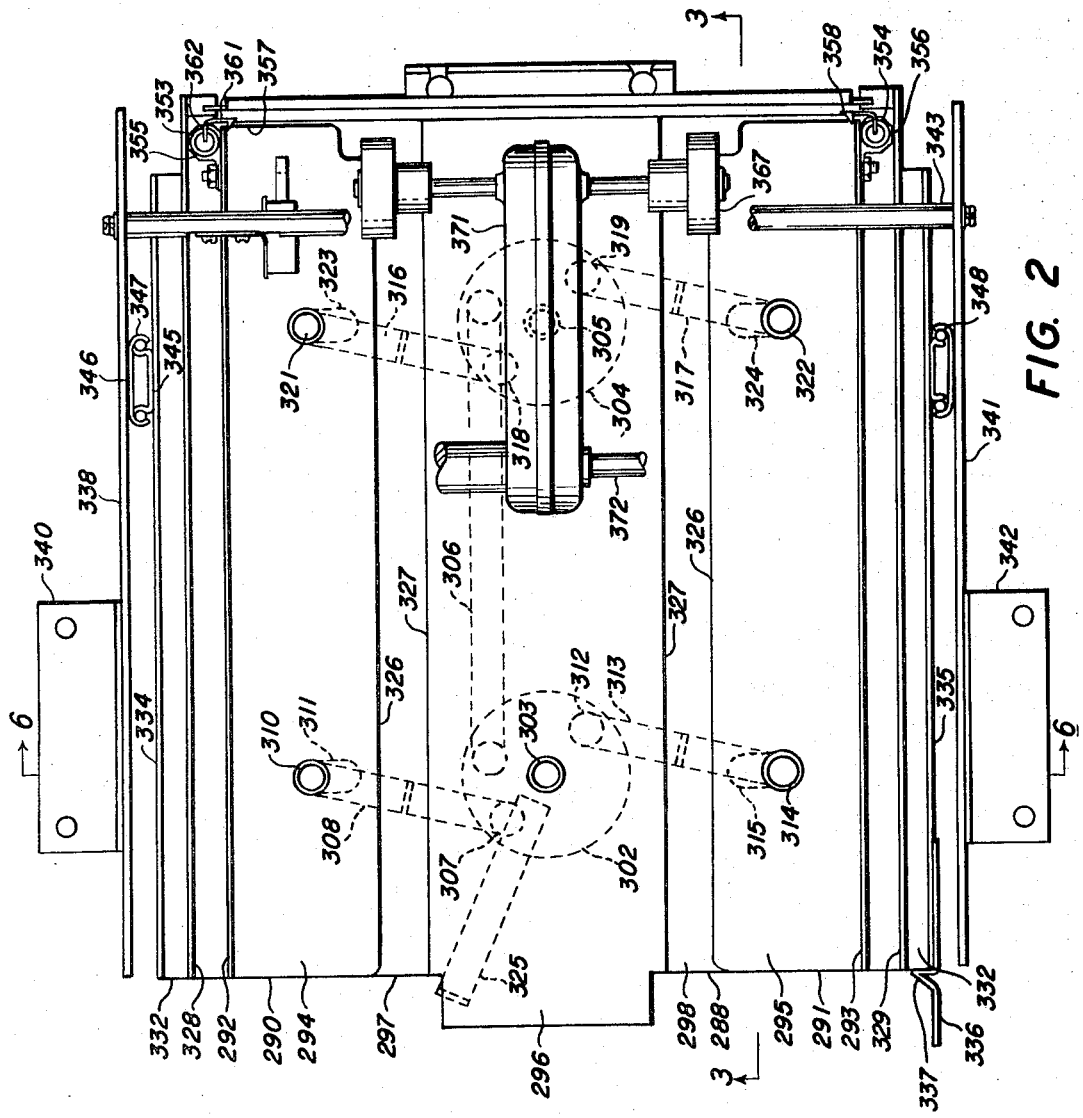

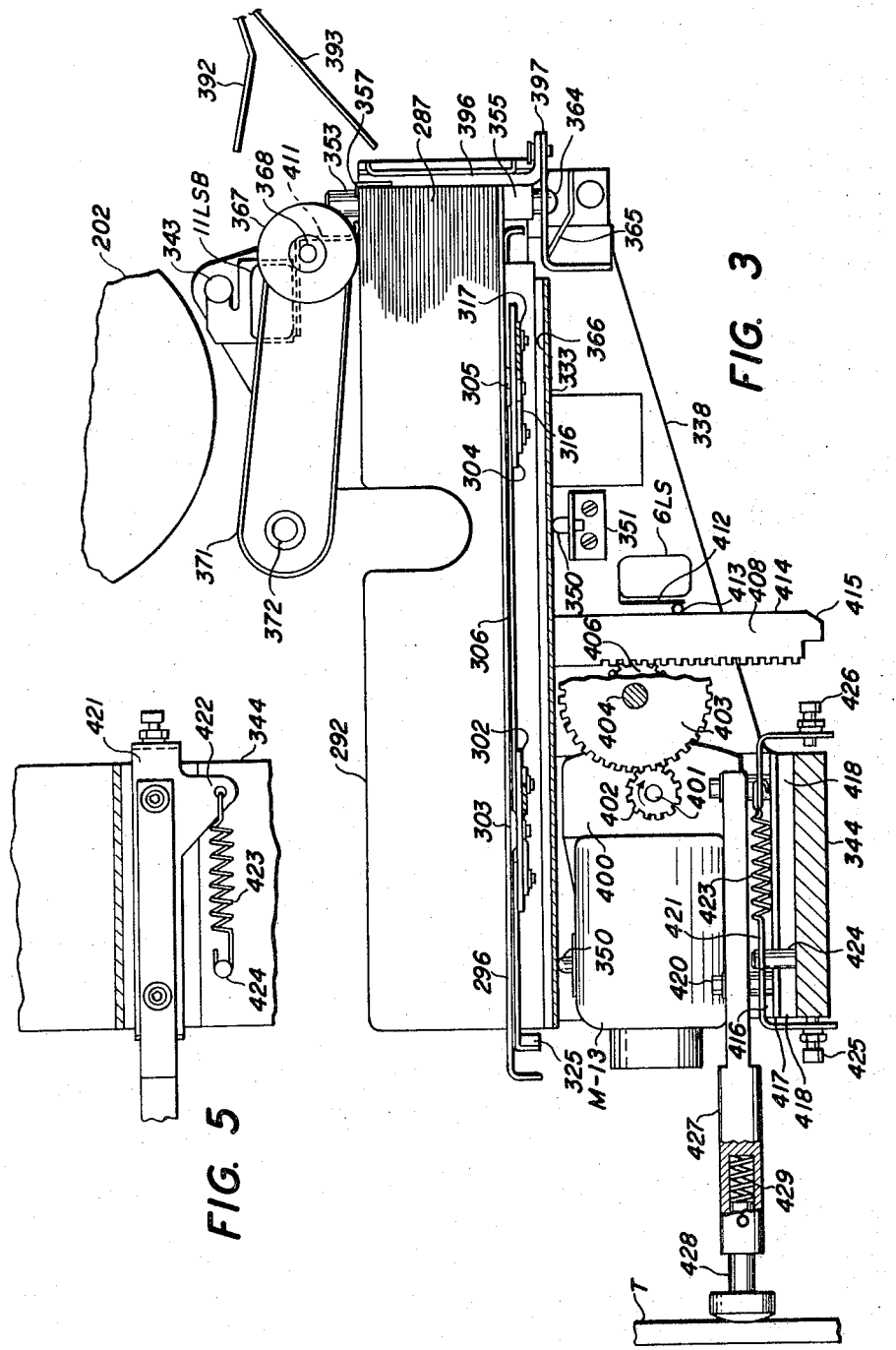

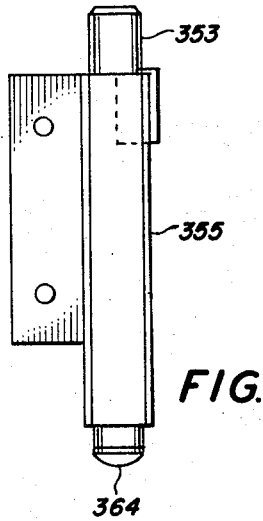
FIG. 8
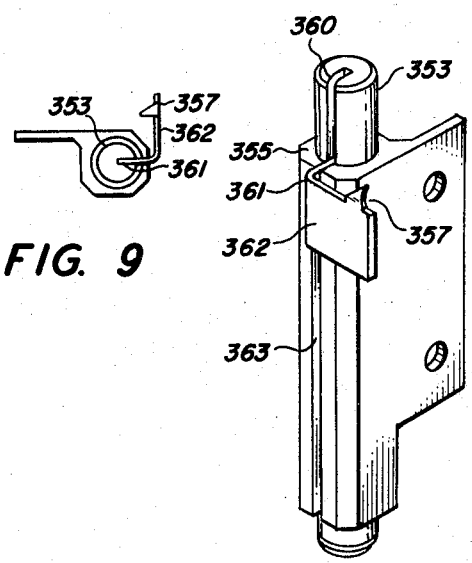
FIG. 9
FIG. 7
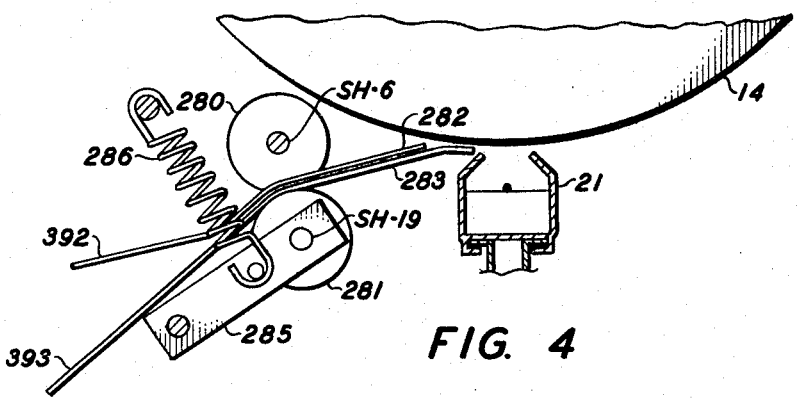
FIG. 4

INVENTORS.
JAMES R. CASSANO
LYMAN H. TURNER

ATTORNEYS

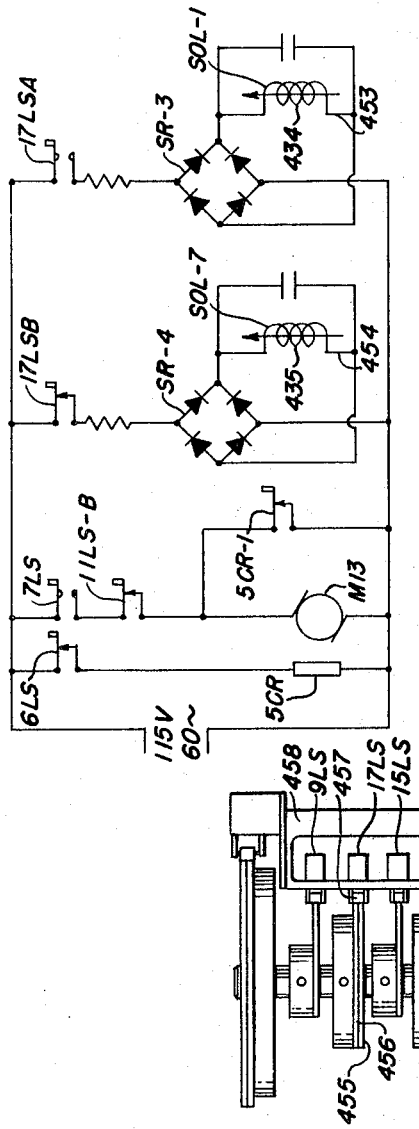
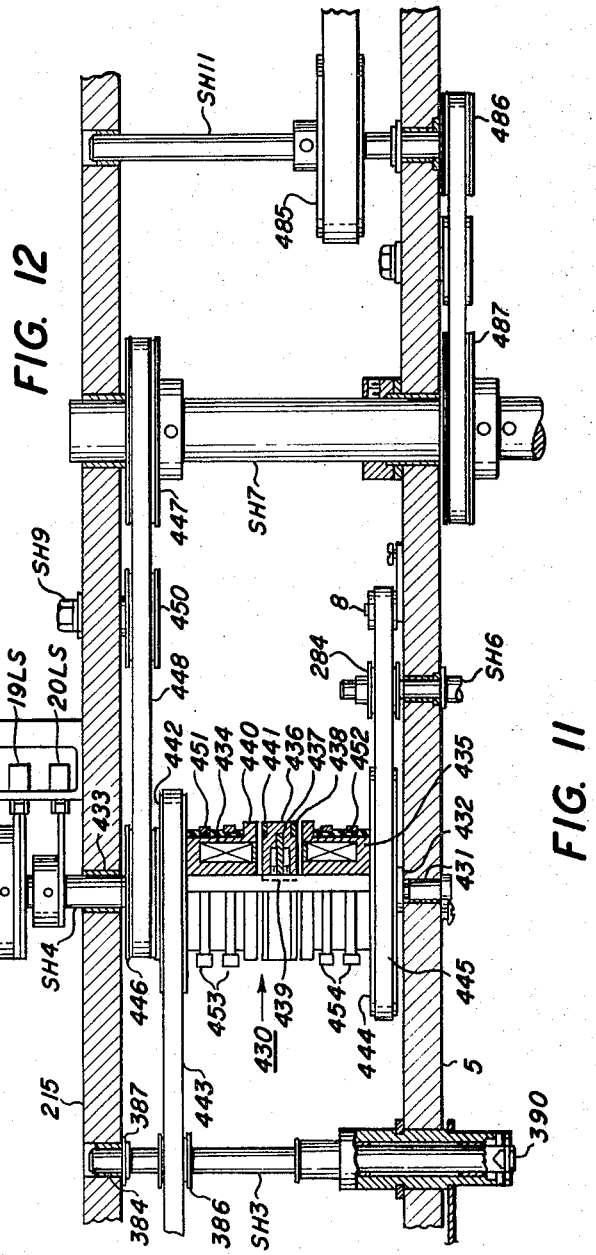

3,300,206
ELECTRICALLY ENERGIZED CLUTCH FOR SHEET FEED CONTROL MECHANISM

James R. Cassano, Rochester, and Lyman H. Turner, Pittsford, N.Y., assignors to Xerox Corporation, Rochester, N.Y., a corporation of New York
Filed Dec. 31, 1964, Ser. No. 422,700
1 Claim. (Cl. 271—16)

This invention relates to improvements in paper feeding devices and, particularly, to an improved sheet feeding apparatus for use by which sheets of paper are fed seriatim to a xerographic drum.

More specifically, the invention relates to an improved paper feed device control mechanism which will cause the separation and advancement of a single sheet from a stack of sheets to a xerographic drum in proper sequence and in timed relationship with a powder image on the drum. Although the invention is considered to have general application, it is particularly useful in the field of xerography and has an important application in the feeding of cut sheets of paper for xerographic processing. Therefore, for convenience of illustration, the invention is described with reference to its use as a paper feeding mechanism for use in a xerographic machine. However, it is to be understood that it may be employed with equal facility in other fields.

It is, therefore, the principal object of this invention to improve sheet feeding mechanisms whereby proper and positive coordination is attained between the operation of a sheet separator and feed rollers to effect the feeding of a sheet into contact with the xerographic drum for proper registration with the powder image thereon.

For a better understanding of the invention as well as other objects and further features thereof, reference is had to the following detailed description of the invention to be read in connection with the accompanying drawings, wherein:

FIG. 2 is a top view of the paper tray and paper feed mechanism;

FIG. 3 is a side sectional view of the paper feed mechanism and the paper level control mechanism taken along the lines 3—3 in FIG. 2, with some parts removed;

FIG. 4 is a sectional view of the paper register rollers associated with the paper feed mechanism;

FIG. 5 is a fragmentary view of a detail in the paper level control mechanism;

FIGS. 7, 8 and 9 are illustrations of a detail used in separating sheets from a stack of papers, shown in perspective, from the side and the top, respectively;

FIG. 11 is a schematic view of a drive system for use with the paper feed mechanism; and FIG. 12 is an electrical circuit that may be utilized for the operation of the invention.

Figure 1:
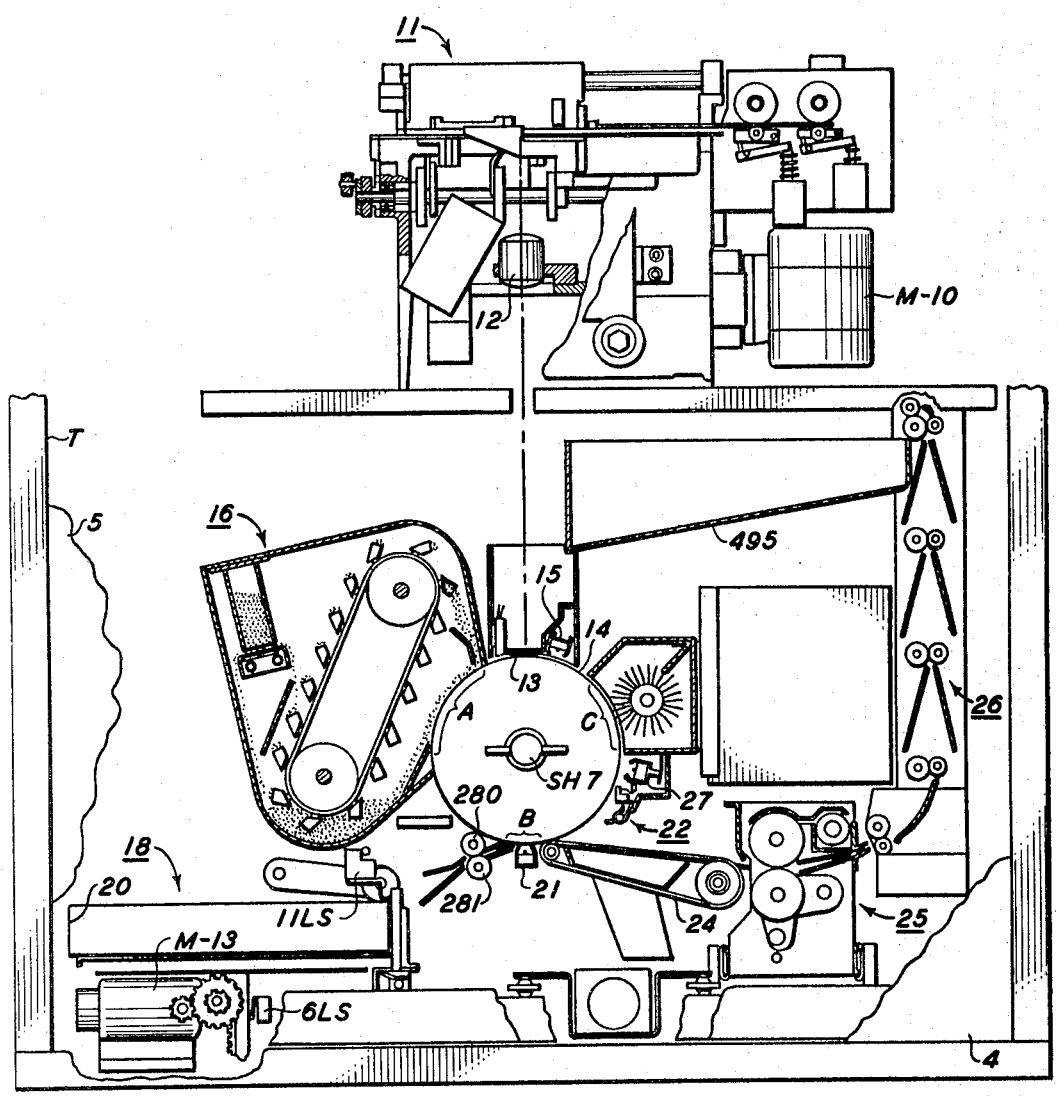
FIG. 1 illustrates schematically the preferred embodiment of a xerographic reproducing apparatus adapted for automatic operation, and incorporating a paper feed mechanism constructed in accordance with the invention.

Although it forms no part of the subject invention, there is shown schematically in FIG. 1 a continuous xerographic apparatus for the purpose of illustrating a suitable environment for the paper feed mechanism of the subject invention.

As shown schematically in FIG. 1, the automatic xerographic reproducing apparatus comprises a xerographic plate 14 including a photoconductive layer or light-receiving surface on a conductive backing and formed in the shape of a drum, which is mounted on a shaft journaled in a frame to rotate in the direction indicated by the arrow to cause the drum surface sequentially to pass a plurality of xerographic processing stations.

For the purpose of the present disclosure, the several xerographic processing stations in the path of movement of the drum surface may be described functionally as follows:

A charging station, at which a uniform electrostatic charge is deposited on the photoconductive layer of the xerographic drum;

An exposure station, at which a light or radiation pattern of copy to be reproduced is projected onto the drum surface to dissipate the drum charge in the exposed areas thereof and thereby form a latent electrostatic image of the copy to be reproduced;

A developing station, at which a xerographic developing material including toner particles having an electrostatic charge opposite to that of the electrostatic latent image are cascaded over the drum surface, whereby the toner particles adhere to the electrostatic latent image to form a xerographic powdered image in the configuration of the copy being reproduced;

A transfer station, at which the xerographic powder image is electrostatically transferred from the drum surface to a transfer material or support surface; and A drum cleaning and discharge station, at which the drum surface is brushed to remove residual toner particles remaining thereon after image transfer, and at which the drum surface is exposed to a relatively bright light source to effect substantially complete discharge of any residual electrostatic charge remaining thereon.

As shown, the charging arrangement includes a corona charging device 15 which includes a corona discharge array of one or more corona discharge electrodes that extend transversely across the drum surface and are energized from a high potential source and are substantially closed within a shielding member.

Next subsequent thereto in the path of motion of the xerographic drum is an exposure station. An optical scanning or projection system is provided to project a flowing image onto the surface of the photoconductive drum from a moving original.

The optical scanning or projection assembly may comprise a minified data card projection system 11 which is adapted to scan individual data cards with a light line and project the image rays onto the moving light-receiving surface of the xerographic drum. The scanning light may be provided by a suitable light source arranged to scan a minified data card. The data card image rays are directed through a lens 12 onto the xerographic drum through a slot in a fixed light shield 13 positioned adjacent to the xerographic drum surface.

Adjacent to the exposure station is a developing station A in which there is positioned a developer apparatus 16 including a casing or housing having a lower or sump portion for accumulating developer material. A bucket type conveyor is used to carry the developing material to the upper part of the developer housing where it is cascaded over a hopper chute onto the xerographic drum to effect development.

Positioned next and adjacent to the developing station is the image transfer station B which includes a sheet feeding arrangement adapted to feed sheets of support material, such as paper or the like, successively to the xerographic drum in coordination with the presentation of the developed image on the drum surface at the transfer station.

The sheet feeding mechanism includes a sheet feed device 18 adapted to feed the top sheet, of a stack of sheets on a tray 20 to feed rollers which arrests and aligns each individual sheet of material and then in timed relation to the movement of the xerographic drum, advances the sheet material into contact with the xerographic drum in registration with a previously formed xerographic powder image on the drum.

The transfer of the xerographic powder image from the drum surface to the sheets of support material is effected by means of a corona transfer device 21 that is located at or immediately after the line of contact between the support material and the rotating drum. In operation, the electrostatic field created by the corona transfer device is effective to tack the support material electrostatically to the drum surface, whereby the support material moves synchronously with the drum while in contact therewith. Simultaneously with the tacking action, the electrostatic field is effective to attract the toner particles comprising the xerographic powder image from the drum surface and cause them to adhere electrostatically to the surface of the support material.

Immediately subsequent to the image transfer station, there is positioned a stripping apparatus to paper pick-off mechanism 22 for removing the sheets of support material from the drum surface. This device may be of the type disclosed in Rutkus et al United States Patent 3,032,-536 for stripping the leading edge of the sheet from the drum surface and to direct it onto an endless conveyor 24 whereby the sheet material is carried to a fixing device 25.

At the fixing device, the transferred xerographic powder image on the sheet of support material is permanently fixed or fused thereto as by heat. After fusing, the reproduction is discharged from the apparatus at a suitable point for collection externally of the apparatus by means of the conveyor 26. In the arrangement shown, the reproductions are discharged from conveyor 26 into a receiving tray 495.

The next and final station in the device is a drum cleaning station C, having positioned therein a corona pre-clean device 27 to remove any powder remaining on the xerographic drum after transfer.

It is believed that the foregoing description is sufficient for the purposes of this application to show the general operation of a xerographic reproducing apparatus using a roller fusing device constructed in accordance with the invention. For further details concerning the specific construction of the xerographic apparatus and the data card handling apparatus 11, reference is made to copending application, Serial No. 422,804, filed concurrently herewith on December 31, 1964, in the name of Hewes et al.

Referring now to FIGS. 2–11 of the drawings, there is shown a preferred embodiment of a paper feed mechanism 18 constructed in accordance with the invention.

The sheet feeding mechanism 18, positioned in the image transfer station B, for seriatim feeding of cut-sheet transfer material into contact with the xerographic drum so that the developed powder images on the surface of the drum may be transferred to the transfer material, consists of a tray for holding a supply of cut-sheet transfer material, separator rollers and devices for separating a single sheet of transfer material from said supply, feed rollers for feeding a single sheet into impression contact with the drum and means for coordinating the operation of the separator rollers and feed rollers to thereby feed a single sheet of transfer material into contact with the drum for proper registration of the powder image on the drum onto the transfer material. A paper tray level control device is also provided for raising the tray as sheets of paper are fed from the top of the paper supply.

The apparatus for feeding sheets of transfer material to the xerographic drum 14 in timed relation to the appearance of a developed image thereon includes a pair of register feed rollers 280 and 281, usually made of rubber or similar material, mounted in cooperative relation to each other in front of guides 282 and 283 which direct sheets of transfer material forwarded by said feed rollers into contact with the drum 14 at a point at or slightly in advance of the corona transfer device 21.

The feed roller 280, which is a driven roller, is mounted in position by a shaft SH6 journaled in the machine support plates 4 and 5 and is driven by a pulley 284 (see FIG. 11) secured to the end of shaft SH6. The feed roller 281, which is an idler roller, is mounted on a shaft SH19 journaled at its end in arms 285 pivotally mounted on frame plates 4 and 5, the feed roller 281 being yieldingly biased against the feed roller 280 by means of springs 286 so that feed roller 281 may be driven by frictional engagement with roller 280 or with a sheet of transfer material interposed between said rollers.

A supply of cut-sheet transfer material 287, that is, typically sheets of paper or the like, to be fed one at a time to the feed rollers 280 and 281 is held in the paper tray 20 slidably positionable from the side of the machine between frame plates 4 and 5. The paper tray 20 includes a base comprising three sections: a stationary base member 288, a left-hand angle member 290 and a right-hand angle member 291. The angle members 290, 291 are each formed with upright sheet guide portions 292, 293 and lateral portions 294, 295, respectively, and are positioned with their guide portions parallel to the sides of the base member 288 and with their lateral portions extending in the same plane as the center section 296 of the base member 288.

Figure 6:
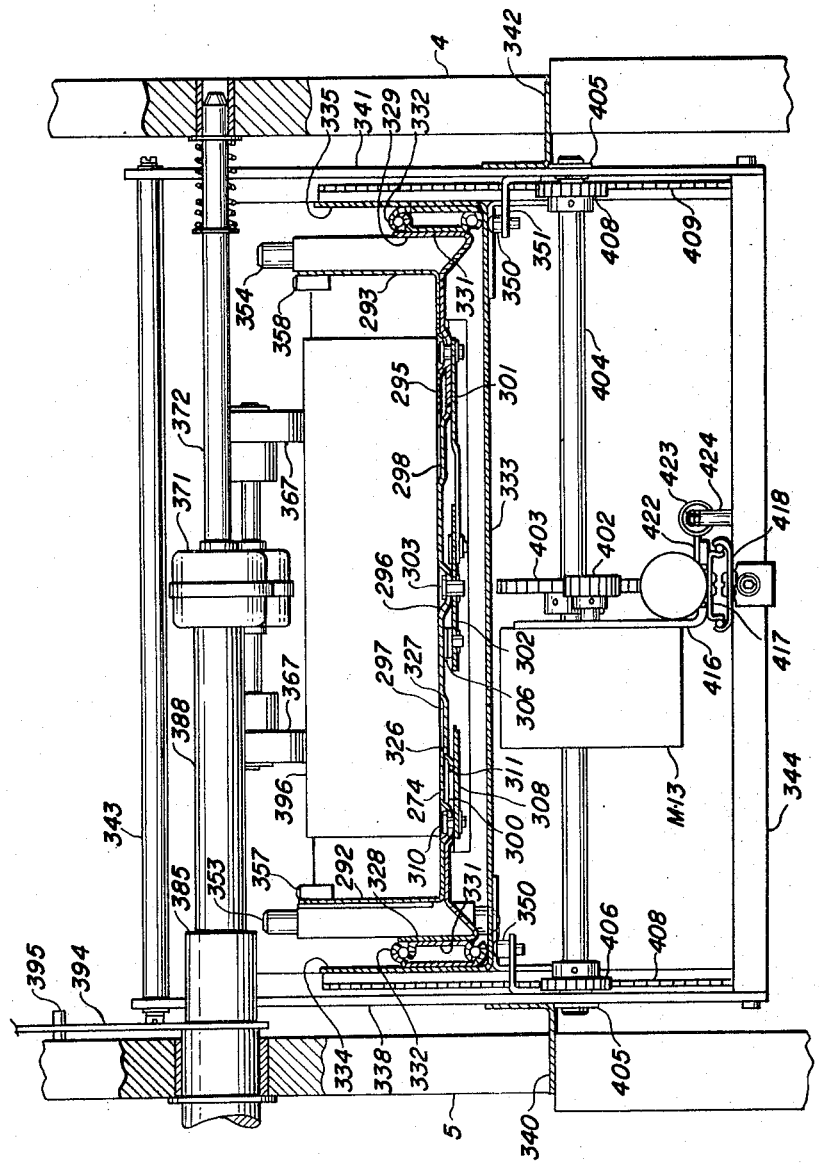
FIG. 6 is a sectional view of the paper feed mechanism taken along the line 6—6 in FIG. 2.

The members 290 and 291 are actuatable toward and away from each other and the center section 296 by a linkage system mounted below the section 296. As shown in FIG. 6 the base member 288 is formed with the center section 296 coplanar with the left and right lateral sections 294, 295 and with a left side bent down portion 297 and a right side bent down portion 298. The portions 297, 298 are coplanar and are located immediately below the sections 294, 295, respectively, and upon which these sections may slide toward and away from the center section 296. The base member is formed with additional bent down portions 300, 301 beyond the extremities of the portions 297, 298, respectively, and these portions are coplanar in a plane slightly below the plane of portions 297, 298.

Immediately below the center section 296 and toward the rear of the tray 20 is a disk 302 rotatably mounted as by a pivot pin 303. Similarly, a second disc 304 is rotatably mounted as by a pivot pin 305 under the forward end of the tray. The discs 302, 304 are arranged so that their centers are coincident with the longitudinal center line of the tray. A connecting link member 306 disposed between the center section 296 and the discs 302 and 304 is pivotally connected at one end to the disk 302 and at its other end to the disc 304 and, in such a manner as to be longitudinally parallel to the longitudinal axis of the tray 20. With this arrangement, rotation of the disc 302 will produce corresponding rotation of the disc 304.

Pivotally mounted at one end to and below the disc 302 as by a pivot pin 307 is a link member 308 which is pivotally connected at its other end by a pivot pin 310 to the lateral portion 294 of the left hand angle member 290. The pivot pin 310 extends through a slot 311 formed in the bent portion 300 of the base member 288 in order to connect the portion 294 with the end of the link 308. Diametrically opposed to the pivot pin 307 is a pivot pin 312 to which is pivotally connected a second link member 313 which has its other end pivotally connected to the lateral portion 295 as by a pivot pin 314. The pivot pin 314 extends through a slot 315 formed in the bent portion 301 in order to make connection with the link 313, which, as is the case for the link 308, is located below the disc 302. As viewed in FIG. 2, counterclockwise rotation of the disc 302 will move the pivot pins 310, 314 closer together along a line that generally includes the pivot pin 303. Conversely, clockwise rotation of the disc 302 will move the pins 310, 314 further apart, in each case the pins 310, 314 sliding within and being guided by the slots 311, 315, respectively.

At the forward end of the tray 20, or that end from which each sheet of transfer material 287 is withdrawn during paper feed operation, the disc 304 is provided with an identical linkage arrangement. Link members 316, 317 are pivotally connected at one end by pins 318, 319, respectively, at diametrically opposed points on the disc 304 and at their other ends by pivot pins 321, 322 to the bent portions 300, 301, respectively. Slots 323, 324, formed in the bent portions 300, 301, accommodate the respective pins in order to permit limited sliding movement of the pins relative to the respective bent portions.

In order to actuate the linkage thus far described, the rear disc 302 is provided with a manually actuatable handle 325 which may be secured as by welding to the disc. Movement of the handle 325 in a counterclockwise direction, as seen in FIG. 2 will similarly rotate the disc 302 about the pivot 303. This action will move the pins 310, 314 toward each other. Rotation of the disc 302 will also produce corresponding rotation of the disc 304 by means of the connecting link 306, and this action will move the pins 321, 322 closer together. Movement of the pins 310, 321 will be in unison and equal to the movement of the pins 314, 322. The resultant action will draw the left and right upright guide portions 292, 293 closer together in parallel and equal motion resulting in centering sheets of paper relative to their path of movement, regardless of paper width.

During operation of the xerographic apparatus, a stack of transfer material sheets is placed in the tray 20 and the handle 325 manipulated to bring the guides 292, 293 into contact with the adjacent edges of the sheets. This will insure that the stack is centrally located within the tray and in proper alignment with the paper feed rollers. In order to remove the stack, or to replace sheets, the handle 325 is rotated in a clockwise direction which results in the guides 292, 293 being moved away from the stack thereby clearing the same of impeding structure. In their movement toward or away from the stack of transfer material, the guides 292, 293 will slide with relative ease upon the bent portions 297, 298, respectively. Their limit of travel in one direction will be determined by the engagement of the inner edges 326 of the portions 294, 295 with the bent edges 327 of the central section 296 when there is no paper sheets in the tray and, will be determined by the guides 292, 293 when sheets are present in the tray. The limit of travel in the other direction will be determined by the length of the slots 311, 315, 323, 324.

The tray 20 comprising the base member 288, the guides 292, 293 and the linkage arrangement is mounted for longitudinal movement as a unit toward and away from the feed rollers 280, 281. To this end, the base member 288 is formed with up-turned flanges 328, 329 at each extreme side edge. These flanges extend beyond the guides 292, 293 and have secured thereto the inner race 331 of a commercial type file cabinet drawer slides. The outer races 332 for the slides are attached to a support bracket 333 which extends across and beneath the entire tray 20 and terminates beyond the side thereof into upstanding flanges 334, 335. Each of the outer races 332 is secured as by welding to the inner surface of the flanges 334, 335 and serve to support the tray 20 and the linkage system relative to the support bracket 333. Suitable ball-bearings mounted between the races 331 and 332 permit slidable action between the tray 20 and the bracket 333 and removal of the tray from the apparatus. A spring latch 336 secured to the flange 335 by welding has a bent end 337 engageable with the rear end of one of the inner races 331 which serves to detachably retain the tray in a relatively fixed position.

The tray 20 is also mounted for vertical movement and to this end there is provided a left-hand support plate 338 secured to the frame plate 5 by a bracket 340 and a right-hand support plate 341 secured to the frame plate 4 by a bracket 342. The support plate 338 and 341 are joined together at their top portion by a connecting rod 343 and at their lower portions by a support bar 344. Positioned between and secured to the flange 334 and the support plate 338 are the inner and outer races 345, 346, respectively, of a file drawer slide 347 having suitable ball bearings between the races. Similarly, the flange 335 and the support plate 341 have the inner and outer races of a cabinet slide 348 mounted therebetween. Each of the slides 347, 348 extends vertically a distance that will facilitate vertical movement of the tray 20 between its full range of movement while preventing rocking movement of the tray relative to the fixed supporting structure for the tray.

The lower limit of movement of the tray is determined by a plurality of steps 350 mounted on brackets 351 that are secured to the flanges 334, 335. Preferably the steps 350 are located adjacent the four corners of the tray in order to prevent uneven settling of the tray and its associated parts.

In feeding sheets from the stack 287, one at a time, as the topmost sheet is advanced forward, the movement of the topmost sheet will tend to advance the second sheet also. In order to insure separation of the topmost sheet only from the stack, there is provided at opposite corners from the stack separating devices which apply a light restraining force on the forward corners of the topmost sheet and the leading edge of the paper stack. Each of the separating devices comprise a vertically movable plunger 353, 354 freely movable in a tubular element 355, 356 secured to the outside surface of upright portions 292 and 293, respectively, to be movable laterally therewith. Each of the plungers 353, 354 has a snubber 357, 358 secured thereto to be movable therewith. Since the separating devices are formed complementary to each other, it is believed necessary to describe only one of the devices in detail. As shown in FIGS. 7, 8 and 9 the plunger 354 is formed with a radial slot 360 and within which is secured one leg 361 of a bent element 362 upon which is secured the snubber 358. A slot 363 is formed axially along the wall of the tubular element 356 and the leg 361 extends through and is slidable within this slot which retains the snubber 358 against rotation. With the plunger 358 being located on one side of the paper stack 287, the snubber 358 is positioned against the leading edge of the stack with the snubber overlying the corner of the topmost sheet. The elements 358, 361, 362 of the separating device are preferably formed as a unitary structure stamped from sheet material.

The weight of each of the plungers 353, 354 is imposed on the upper forward corners of the paper stack and the weight on each corner is such that the plungers will follow the level of the stack downwardly as the stack level is lowered. Their weights also provide a restraining force which will assist in the feeding of a single sheet of paper when the stack is acted upon by separator rollers to be described hereinafter.

As shown in FIG. 3, the lower ends of the plungers 353, 354 extend beyond the depth of the stack 287 and terminate in rounded ends 364 preferably made from a plastic material such as Teflon. These ends are adapted to ride upon inclined plates 365 located below the plungers and the outer edges 366 of the support bracket 333 on either side of the tray when the tray is moved rearwardly. As the tray 20 is retracted from its paper feeding position, or to the left as shown in FIG. 3 the plungers 353, 354 will engage the inclined plates 365 and be raised where they will remain as the tray is retracted. With the plungers held in their uppermost position, the snubbers 357, 358 will be clear of the paper stack thereby permitting the adding or removal of paper sheets from the tray without encountering interference. Assuming that a new supply of paper has been placed upon the tray and the same is moved to its forward position, the plungers will again resume their positions with the snubbers resting upon the topmost sheet of the new supply.

To feed sheets of transfer material one at a time from the paper tray 20 into the bite of the feed rollers 280, 281, there is provided a paper feeding means comprising intermittently driven rollers 367 fixedly mounted upon a shaft 368 journaled in bearings 370 mounted in an arm 371 adapted to swing about the axis of a shaft 372. The means for driving the rollers 367 comprises a pulley 373 secured to a conventional slip clutch 374, and a pulley 375 mounted on the shafts 368 and 372, respectively, and operatively connected together by means of timing belt 376. The slip clutch 374 permits the rollers 367 to be rotated either by the timing belt 376 or by frictional contact with a sheet of transfer material as it is pulled forward by the feed rollers 280 and 281.

Figure 10:
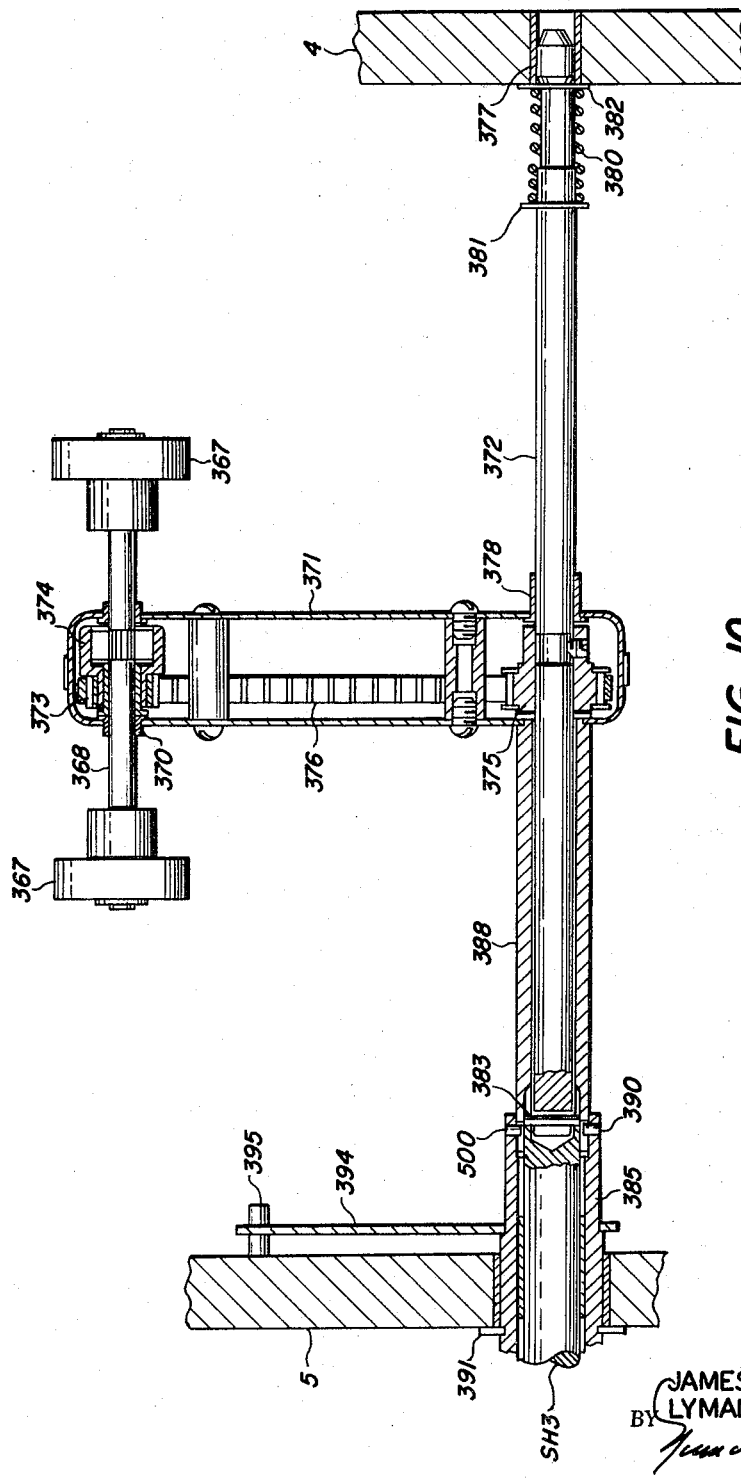
FIG. 10 is a sectional view of the paper separator roller and the associated elements.

The shaft 372 is journaled by a bearing 377 in the front plate 4, and by a bearing 378 in the arm 371 and, is normally biased to the left as seen in FIG. 10 by means of a spring 380 interposed between a snap ring 381 on the shaft 372 and a shaft encircling washer 382 butted against the plate 4. As shaft 372 is forced to the left, the notched end of said shaft is forced into the aperture in the end of a shaft SH3 to engage drive pin secured therein. As shown in FIG. 11, the shaft SH3, which is journaled in suitable bearings 384 positioned in the frame plate 215 and a sleeve 385 in the rear plate 5 has an intermittently driven pulley 386 secured thereon. As washer 387 rides against a shoulder on shaft SH3 to prevent outward axial movement of said shaft as viewed in FIG. 11.

To adjust the pressure of rollers 367 on the stack of transfer material in paper tray 20, the arm 371 is fixed to one end of a hollow arm shaft 388, the opposite end of the arm shaft being notched to engage locating pins 390 secured to the counterbored end of the sleeve 385 journaled in the plate 5, the sleeve being retained against axial movement to the right as seen in FIG. 10 by a snap ring 391 secured in a suitable groove formed in the sleeve. The roller pressure on the stack of paper in paper tray 20 due to gravity is sufficient to maintain the sheets of paper in position within the tray.

Interposed between rollers 367 and feed rollers 280 and 281 there is provided, as shown in FIGS. 3 and 4 a pair of paper guides 392 and 393 supported at opposite ends by the plates 4 and 5 to guide each sheet of transfer material forwarded by rollers 367 into the bite of rollers 280 and 281.

To permit the rollers 367 to clear a stack of copy sheets in the tray 20 as the tray is moved to its normal operating position as shown in FIG. 3 (or when the tray is removed from its normal operating position), there is provided a cam arm 394 secured to the sleeve 385 and a cam pin 395 secured to the plate 5 for limiting the downward movement of the pivot arm 371 and the rollers 367. As will be described hereinafter, the height of the paper stack 287 is maintained relatively constant, varying only by the thickness of a few sheets of paper. The cam pin 395 is positioned such that if the tray 20 is retracted, the rollers will lower only slightly and, upon movement of the tray to its normal paper feed position, the rollers 367 will ride upward by its engagement with leading edges of the first few topmost sheets.

Forward progress of the tray movement up to its operating position is determined by a margin guide 396 which extends vertically from the forward portion 397 of the support bracket 333 to which it is secured. The guide 396 maintains the forward edges of the sheet of paper in generally vertical alignment and prevents inadvertent slippage of any or all the sheet. The height of the guide 396 is normally below that of the snubbers 357, 358 which, as previously stated, rest upon the corners of the topmost sheet of the stack 287, while the height of the snubbers will vary somewhat, by the thickness of a few sheets of papers. They will always occupy a position no lower than the upper edge of the margin guide 396 which must be cleared for a sheet of paper to be fed to the feed rollers 280, 281.

In operation, as the topmost sheet is advanced by the rollers 367, the leading edge corners of the sheet engage the snubbers 357, 358 whereupon the sheet will buckle upwardly and inwardly. As shown in FIGS. 2 and 9, the snubbers are tapered, being formed with an inner edge that is at an acute angle relative to the leading edges of the sheets of paper. As the rollers 367 apply a forward force to the topmost sheet, the vertical portion of the elements 362 result in a lag in the forward movement of the corners as the sheet is continually advanced over the upper edge of the margin guide 362. This lag in cooperation with the angled inner edges of the snubbers will produce slightly inward sliding movement of the corners of the sheet of paper with consequent buckling of the sheet at its middle section. This buckling action of the topmost sheet insures its separation from the underlying sheets in the stack.

As previously stated, the tray 20 is adapted for vertical movement in order to maintain the plane or the level top of the stack 287 at a relatively fixed point. This is accomplished by the use of a motor drive and a switching arrangement which will drive the tray 20 upwardly from an initial lower position when the tray supports a stack of paper to an uppermost position of the tray when only a few sheets of paper remain in the tray.

This drive action is provided by a paper level drive motor M13 mounted for sliding movement upon the stationary support bar 344. The motor M13 is provided with a gear reduction device 400 and the output thereof is taken from the output shaft 401 to which is secured a drive gear 402. When the motor M13 is in its forward drive position, as shown in FIG. 3, the drive gear 402 is in mesh with a substantially larger driven gear 403 secured intermediate the ends of a shaft 404 which extends below and transversely of the tray 20, terminating in suitable bearings 405 mounted in the fixed support plates 338, 341.

Secured to the ends of the transverse shaft 404, inwardly of the support plates 338, 341 are gears 406, 407 each of which is in mesh with gear racks 408, 409, respectively. The rack 408 is secured to and depends downwardly from the outer surface of the flange 334, which, as was previously stated, is part of the support bracket 333. The rack 409 is secured to the other flange 335 of the bracket 333 and depends downwardly in the same manner. With the bracket 333 being movable vertically by means of the slides 347, 348, rotation of the gears 406, 407 in a counterclockwise direction, as viewed in FIG. 3, will drive the racks vertically for moving the support bracket 333 upwardly. This movement will carry the tray 20 and, consequently, the stack 287 therewith.

Preferably, the motor M13 is of the type which includes an internal braking device which permits rotation of its output shaft 401 when the motor is energized but locks the drive shaft against mechanical rotation when the motor is de-energized. Energization of the motor M13 is under control of a paper level limit switch 11LSB and a paper low limit switch 6LS. The limit switch 11LSB is mounted on the connecting rod 343 which extends across the tray above the level of the stack 287 and is provided with a depending paper level contacting finger 411 for actuating the switch into its open and closed positions. Normally, the switch 11LSB is in its closed condition when no force is placed upon the finger 411; however, when the level of the stack reaches a predetermined height, the top of the stack engages this finger to actuate the switch 11LSB to its open condition.

As shown in the circuit diagram in FIG. 12, the switch 11LSB is connected in series with the motor M13 and a suitable door interlock switch 7LS which is in closed condition when a door to the base section for the apparatus is closed. When the top of the stack 287 is below the predetermined level, the motor M13 will be energized until the top of the stack reaches the predetermined level whereupon the switch 11LSB will be actuated to its open position for de-energizing the motor. Preferably, the gear reduction for the motor is such that the gears 406, 407, will rotate approximately at the rate of 2 r.p.m. This slow speed will insure proper orientation of the sheets of paper upon the tray during movement and sudden stopping thereof.

The limit switch 6LS is secured to the fixed support plate 338 and includes an actuating arm 412 having a roller 413 thereon which is adapted to continuously engage one edge 414 of the gear rack 408. The switch 6LS is normally closed when the rack 408 is in the position shown in FIG. 3 thus maintaining the circuit to a low-paper relay 5CR closed. For purposes of illustration, it will be assumed that the continuous xerographic printing cycle of the xerographic apparatus is dependent upon the closed condition of a normally closed switch 5CR-1 and that the program arrangement for the electrical circuit for the apparatus is such that if the switch 5CR-1 is opened, printing by the apparatus will terminate which occurs when the relay 5CR is de-energized. De-energization will occur when the limit switch 6LS is actuated to its open position.

As the tray is moved upwardly when the paper is being fed out of the tray 20 under the power produced by the motor M13 and as controlled by the level determining switch 11LSB, the roller 413 on the actuator arm for the paper low switch 6LS approaches a detent 415 formed at the lowermost point of the gear rack 408. This occurs as the paper stack becomes gradually depleted through use of the xerographic apparatus. When the paper tray 20 contains only a few sheets of paper, the roller 413 will roll into the detent 415 causing actuation of the switch 6LS to its open position which, in turn, will open the circuit to the relay 5CR and permit opening of the switch 5CR-1. With the printing apparatus shut down, the operation of the xerographic apparatus terminates until paper is added to the tray 20 in order to cause closing of the paper-low switch 6LS.

As previously stated, the motor M13 is provided with an internal braking device which, when the tray 20 is in its paper-low, uppermost position, to produce opening of the switch 6LS, will prevent mechanical reversal of the motor when deenergized and thus prevent lowering of the tray under the weight of a new stack of sheet material or under any loading condition. In order to produce lowering of the tray for permitting an operator to add paper, the paper feed mechanism also includes a mechanical interlock device between the door T to the printing apparatus and the tray drive motor M13.

This mechanical interlock device is associated with the paper level drive motor M13 and is arranged to physically move the motor into or out of engagement with the gear system for the tray raising function. As shown in FIG. 6, the motor is mounted by a bracket 416 to the upper inner race 417 of a drawer slide, having a lower outer race 418 secured to the support bracket 344. The bracket 416 also has secured thereto by vertically positioned bolts 420, the bight portion of a U-shaped member 421 the legs of which extend downwardly to straddle the slide races 417, 418 as well as the bracket 344. The member 421 is formed with a lateral extending tongue 422 having secured thereto one end of a coil spring 423 which has its other end secured to a post 424 on the bracket 344. The spring 423 serves to bias the member 421 to the left as viewed in FIG. 5 and whereby to force the motor M13 and its output drive gear 402 in that same direction. Adjusting screws 425, 426 mounted on the legs of the member 421 and engageable with the edges of the bracket 344 set the limit of movement for the motor in either direction.

Normally, the motor M13 is biased to the left until the front adjusting screw 426 is against the adjacent edge of the bracket 344. This action will result in movement of the drive gear 402 to the left to become disengaged from the gear 403 whereupon, the tray 20 will lower by gravity until the support plate 333 comes to a stop upon the stops 350. In order to maintain the drive gear 402 in which with the gear 403, there is provided a door-engaging actuator 427 secured by the bolts 420 to the upper race 417 for actuating the elements 417, 421, 416 and the motor M13 to the right, when the apparatus cabinet door T is in a closed position. This is accomplished by the provision of a push rod 428 at the outer end of the actuator for direct engagement with the door when closed. A coil spring 429 is held within the actuator 427 and serves to force the rod 428 outwardly and to act as an override mechanism in the event that the extreme tips of the teeth of the gear 402 impinge upon the extreme tips of the gear teeth of gear 403. Upon this occurrance, assuming that the door T has been closed, the coil spring 429 will be compressed in order to relieve the mechanical strain upon the rod 427. In the event that there is direct engagement of the gear teeth, any attempt to raise the tray for elevating the sack by rotating the gear 402 will produce meshing wih the gear 403 under the force produced by the spring 429. With the spring 429 being stronger than the spring 423, the bracket 416 will be forced to the right against the force produced by the spring 423 in order to permit proper meshing of the gears 402 and 403.

With the gears in mesh, and the limit switch 11LSB closed because of the lower most position of the paper stack 287, the motor M13 will become energized to raise the tray to pass the position it occupied just previous to the time the door T was opened. The mechanical interlock device, as understood from the foregoing description, is operable to lower the tray 20 whenever the operator opens the door T. Generally, this is necessary only when paper is to be added to the tray and the ensuing lowering of the tray 20 conditions the same for the addition of paper. The operator need only to retract the tray toward the door T to permit actuation of the plungers 353, 354 upwardly out of the way of the remaining paper stack or the completely empty tray. In this arrangement, the chance that the operator will load the tray when the same is not in proper condition, is eliminated.

Both the operation of the paper separator rolls 367 and the paper feed roll 280 is effected by a clutch mechanism 430 having separate clutch drives, the selection of the drives being controlled by means of a duplex clutch shifting armature actuated by a programmer to be discussed hereinafter.

As illustrated in FIG. 11, the clutch mechanism 430 which is supported and housed by the frame plates 5 and 215, includes a horizontal driven shaft SH4 that rotates at one end by means of a pin 431 mounted by a screw in frame plate 5, the end of the shaft being formed with a cavity to receive the end of the pin 431. A thrust washer 432 encircles the shaft on the inside of the plate 5. At its opposite end, the shaft SH4 is journaled in a bearing 433 mounted in the frame plate 215.

The clutch mechanism includes two complementary magnet assemblies 434 and 435 which are free to rotate relative to the shaft. A third clutch element 436, which in effect is an armature and adapted to coact with complementary magnet assemblies 434 and 435, is fitted on shaft SH4 in interposed relation to the magnet assemblies and is free for relative movement with respect to the axis of the shaft SH4. However, the armature is connected to the shaft for rotation therewith by means of a series of flexible metallic diaphragms 437 secured along their peripheries to an internal wall of the central portions of the armature and at their center points to an armature hub 438, which in turn is held in place on the shaft SH4 by a key 439. A spacing 440 is provided on both sides of the armature 436 and the adjacent side wall of each clutch element 434, 435, to permit limited sliding movement of the armature along the shaft in either direction. The armature 436 is provided with friction pads 441 on both sides thereof to be engageable with either magnet assembly 434 or 435, depending upon which of these assemblies are electrically energized.

The frictional surfaces of the armature 436 are spaced a distance slightly smaller than the spacing 440 from the opposed surface of the magnet assemblies to permit axial movement of the armature whereby it may be selectively engaged with either magnet assembly. When either magnet assembly is energized, magnetic flux flows from that assembly into the armature and attracts the armature to that assembly. The ensuing axial movement of the armature is accomplished by deflection of the flexible diaphragm 437 since the hub 438 is fixed on the shaft. The torque developed on the shaft SH4 is transmitted by the armature hub 438, which rotates with the shaft, to the flexible diaphragm and by friction from the friction facings 441 to the assembly 434. The magnet assembly 434 is, in effect, a driving element and is secured to a pulley 442 which in turn serves to drive the pulley 386 by a timing belt 443 for driving the paper feed rollers 367. In a similar manner, the magnet assembly 435 is in effect a driven element secured to a pulley 444 adapted to be connected by timing belt 445 to drive pulley 284 mounted on the shaft SH6 to drive the paper register roller 280.

In order to impart rotation to the shaft SH4 to effect rotation of either the paper feed roller drive shaft SH3 or the paper register roller drive shaft SH6, the shaft SH4 has secured thereto a driven pulley 446 connected to a pulley 447 secured to the drum drive shaft SH7 by a timing belt 448 which also encircles an idler pulley 450 rotatable on shaft SH9. A suitable drive mechanism including a motor (not shown) may be utilized to drive the drum 14 and the paper feed mechanism as part of the main drive system for the xerographic apparatus. Such a drive mechanism may include a pulley 485 mounted on a shaft SH11 and connected to a main motor and a pair of pulleys 486, 487 mounted on the shafts SH11, SH7, respectively, for driving the drum 14. With this arrangement the shaft SH4 is continually rotated along with the drum 14 while the machine is in operation.

The magnet assemblies 434 and 435 are each provided with a pair of commutator rings 451 and 452, respectively, which are adapted to continuously engage suitable brushes 453 and 454. The brushes are part of the electrical circuit for the machine and, as shown in FIG. 12, the brushes 453 connect the coil of the magnet assembly 434, illustrated as a solenoid SOL-1, across the output terminals of a D.C. rectifier SR-3 while the brushes 454 connect the coil of the magnet assembly 435, illustrated as a solenoid SOL-7, across the output terminals of the D.C. rectifier SR-4.

Energization of either the magnet assembly 434 or the magnet assembly 435 is under control of a rotatable cam 455 secured on the shaft SH4, as shown in FIG. 12. The periphery of the cam 455 is formed with a cam lobe 456 which periodically engages and actuates a cam follower 457 mounted to a frame structure 458 secured on the rear frame plate 215. When actuated, the cam follower 457 in turn actuates a paper feed limit switch 17LS, also mounted on the frame structure 458 and comprising two switches 17LSA and 17LSB, one of which will close while the other opens during actuation of the switch 17LS. As shown in FIG. 12, the switch 17LSB is normally closed so that the register roller 280 is normally rotating while the cam 455 is rotating out of engagement with the follower 457. During this cycle of operation, the switch 17LSA is open and the magnet assembly 434 is de-energized. When the lobe 456 is rotated around to engage the follower 457, the switch 17LSB is opened and the switch 17LSA closed. Opening of switch 17LSB will cause de-energization of the magnet assembly 435 which releases the armature 436 therefrom to terminate the drive connection to the register roller. Closing of the switch 17LSA will produce energization of the magnet assembly 434 resulting in the attraction thereto of the armature for producing a drive connection between the shaft SH4 and the feed roller shaft SH3.

Referring back to the operation of the paper feed rollers 367 and the paper register rollers 280 and 281, when the paper feed rollers 367 are driven by the energized magnetic assembly 434, the magnet assembly 435 for driving the roller 280 is de-energized since at this stage of the operation the switch 17LSA is closed. As the rollers 367 are driven, they forward a sheet of transfer material into the bite of rollers 280 and 281 where its forward motion is momentarily stopped. As the movement of a sheet of transfer material under the rollers 367 continues after the leading edge of the sheet has been stopped by rollers 280 and 281, the sheet is buckled as the rollers continue to rotate. The rotation of rollers 367 is continued just sufficiently to bow the paper whereby the resiliency of the paper forces the leading edge of the sheet into transverse alignment with the rollers 280 and 281, irrespective of its original alignment thereto, so that the paper is forwarded by said rollers in correct alignment with the drum 14 as the roller 280 is activated by movement of the cam lobe 456 to close the switch 17LSB, permitting the armature 436 to become magnetically coupled to the magnet assembly 434.

While the invention has been described with reference to the structures disclosed herein, it is not confined to the details set forth; and this application is intended to cover such modifications or changes as may come within the purposes of the improvements or the scope of the following claims.

What is claimed is:

In a sheet feeding apparatus, the combination of a frame, a feed tray mounted on said frame to support a stack of sheets, feed rollers journaled in said frame in position to receive a sheet from said feed tray, separator means operatively connected to said frame in position to feed sheets seriatim from said feed tray to said feed rollers, a drive shaft, means for continuously driving said shaft, a first clutch element operatively connected to said separator means, and a second clutch element operatively connected to said feed rollers, said first clutch element and said second clutch element being mounted in spaced relation on said drive shaft for rotation relative to said shaft, an armature connected to said drive shaft for rotation therewith and positioned between said first clutch element and said second clutch element for axial movement therebetween, a cam device mounted on said shaft for rotation therewith, a circuit connected to a source of electric power, switching means in said circuit normally held in one of its controlling positions being actuatable into its other controlling position by said cam device during rotation of said shaft, said switch means being adapted to produce energization of said first clutch element while in said one controlling position and to produce energization of said other clutch element while in said other controlling position whereby said armature will move into driving engagement with said first clutch element to actuate said separator means to feed a sheet to said feed rollers and then into driving engagement with said second clutch element to actuate said feed rollers.

References Cited by the Examiner

UNITED STATES PATENTS

| | | | |
|---|---|---|---|
| 692,577 | 2/1902 | Wolfe | 271—21 |
| 718,212 | 1/1903 | Lorimer | 192—142 |
| 1,652,698 | 12/1927 | Boettger | 271—4 |
| 1,687,587 | 10/1928 | Pearne et al. | 192—142 |
| 1,760,600 | 5/1930 | Lockett | 192—142 |
| 2,672,067 | 3/1954 | Hansell | 192—142 X |
| 3,062,109 | 11/1962 | Mayo et al. | 95—1.7 |
| 3,203,279 | 8/1965 | Rahrig et al. | 192—84 |

M. HENSON WOOD, Jr., *Primary Examiner.*

V. C. WILKS, *Assistant Examiner.*